United States Patent
Saito et al.

(10) Patent No.: US 8,698,364 B2
(45) Date of Patent: Apr. 15, 2014

(54) INVERTER-INTEGRATED ELECTRIC COMPRESSOR

(75) Inventors: Atsushi Saito, Takasaki (JP); Makoto Shibuya, Kiryu (JP); Kazumi Ohsato, Maebashi (JP)

(73) Assignee: Sanden Corporation, Gunma (JP)

( * ) Notice: Subject to any disclaimer, the term of this patent is extended or adjusted under 35 U.S.C. 154(b) by 225 days.

(21) Appl. No.: 13/128,113

(22) PCT Filed: Nov. 6, 2009

(86) PCT No.: PCT/JP2009/005921
§ 371 (c)(1),
(2), (4) Date: May 6, 2011

(87) PCT Pub. No.: WO2010/052922
PCT Pub. Date: May 14, 2010

(65) Prior Publication Data
US 2011/0206544 A1 Aug. 25, 2011

(30) Foreign Application Priority Data
Nov. 6, 2008 (JP) .................................. 2008-285570

(51) Int. Cl.
*H02K 9/00* (2006.01)
*H02K 11/00* (2006.01)
(52) U.S. Cl.
USPC ........ 310/71; 310/68 D; 310/68 R; 310/68 A; 366/229
(58) Field of Classification Search
USPC .......... 310/71, 68 D, 68 R, 68 A; 363/48, 37; 336/229, 208, 198
See application file for complete search history.

(56) References Cited

U.S. PATENT DOCUMENTS

| 6,151,228 | A  | * | 11/2000 | Miyazaki et al. ................ 363/48 |
| 6,480,088 | B2 | * | 11/2002 | Okamoto ....................... 336/229 |
| 6,690,257 | B2 | * | 2/2004  | Kobayashi et al. ........... 336/229 |
| 7,207,187 | B2 |   | 4/2007  | Funahashi et al. |

FOREIGN PATENT DOCUMENTS

| EP | 0 113 923   | 7/1984  |
| JP | 59-160420   | 9/1984  |
| JP | 06-036951   | 2/1994  |
| JP | 16526/1995  | 3/1995  |
| JP | 8-335843    | 12/1996 |
| JP | 2008-193767 | 8/2008  |
| JP | 2008-202564 | 9/2008  |

* cited by examiner

*Primary Examiner* — Tran Nguyen
*Assistant Examiner* — Leda Pham
(74) *Attorney, Agent, or Firm* — Cozen O'Connor

(57) ABSTRACT

Provided is an inverter-integrated electric compressor wherein the attachability of a coil component has been improved while reliability of a connection state at the electrical joints is ensured by simplifying a mechanism which electrically connects the coil component, such as one for removing electromagnetic noise, to a motor drive circuit. An inverter-integrated electric compressor, wherein a motor drive circuit including an inverter is surrounded by a compressor housing, is characterized in that a coil component comprising a plurality of conductor wires wound in parallel is attached to the motor drive circuit through a seat, the seat is provided with a protrusion which can be fitted into a seat affixing hole provided in a case member for housing the motor drive circuit, a plurality of terminal holes are arranged in the portion where the protrusion is provided, the plurality of conductor wires pulled out from the coil component are inserted, in a one-to-one correspondence, into the plurality of terminal holes in such a manner that the mutual interval between the wires is widened, and the end of each conductor wire is connected electrically to the motor drive circuit.

7 Claims, 6 Drawing Sheets

(a)

(b)

(a)

(b)

INVERTER-INTEGRATED ELECTRIC COMPRESSOR

RELATED APPLICATIONS

This is a U.S. National Phase Application under 35 USC §371 of International Application PCT/JP2009/005921 filed on Nov. 6, 2009.

This application claims the priority of Japanese Patent Application No. 2008-285570 filed Nov. 6, 2008, the entire content of which is hereby incorporated by reference.

TECHNICAL FIELD OF THE INVENTION

The present invention relates to an inverter-integrated electric compressor in which a motor drive circuit including an inverter is mounted, and specifically relates to an inverter-integrated electric compressor which has improved in workability for affixing a noise removing component, such as a normal mode coil and a common mode coil, in the motor drive circuit.

BACKGROUND ART OF THE INVENTION

As a structure of an inverter-integrated electric compressor in which a motor drive circuit including an inverter is mounted in a compressor, known is a structure where the motor drive circuit is coated with insulation resin coating material and where the motor drive circuit, lead wires and connection terminals are provided in a closed space surrounded by a metal wall, as shown in Patent document 1. Such a structure can reduce the influence of electromagnetic noise as shielding the electromagnetic noise emitted by the lead wires in the closed space surrounded by the metal wall.

In addition, as a structure of a choke coil as used in a noise filter for air-conditioners, known is a structure where a wire is wound around a core cover which is formed by fitting two sub core-covers of the same shape with each other, as shown in Patent document 2. In such a structure, pullout direction of a lead wire is not required to be cared about during the wire wrap work, and therefore the working efficiency of the wire wrap work has been improved.

PRIOR ART DOCUMENTS

Patent Documents
Patent document 1: JP2008-202564-A
Patent document 2: JP6-36951-A

SUMMARY OF THE INVENTION

Problems to be Solved by the Invention

When the coil component as shown in Patent document 2 is used in the inverter-integrated electric compressor as shown in Patent document 1 in order to further reduce the influence of electromagnetic noise, the coil core should be wound with comparatively thick conductor wires in order to suppress heat generation because of great electric current applied to the inverter-integrated electric compressor.

In order to electrically connect the coil component in Patent document 2 to the motor drive circuit of the inverter-integrated electric compressor in Patent document 1, the conductor wire being wound around the coil core can be inserted into a hole of the motor drive circuit board and welded to a terminal section provided on the motor drive circuit board.

However, it is cumbersome to insert the thick conductor wires into the hole of the motor drive circuit board one by one.

In addition, unevenness of positional relation between the conductor wire and a bus bar might worsen the welding efficiency, so as to lower the reliability of connection state between the conductor wire and the bus bar.

Therefore, being focused on the above-described problems, an object of the present invention is to provide an inverter-integrated electric compressor wherein the attachability of a coil component has been improved while reliability of a connection state at the electrical joint is ensured by simplifying a mechanism which electrically connects the coil component removing electromagnetic noise for example, to a motor drive circuit.

Means for Solving the Problems

An inverter-integrated electric compressor according to the present invention is an inverter-integrated electric compressor, wherein a motor is incorporated and a motor drive circuit including an inverter is provided in a housing space surrounded by a compressor housing, characterized in that a coil component comprising a plurality of conductor wires wound in parallel is attached to the motor drive circuit through a seat provided with a protrusion which can be fitted into a seat affixing hole provided in a case member for housing the motor drive circuit, a plurality of terminal holes being arranged in a portion where the protrusion is provided, the plurality of conductor wires pulled out from the coil component being inserted, in a one-to-one correspondence, into the plurality of terminal holes in such a manner that the mutual interval between the conductor wires is widened, an end of each conductor wire being connected electrically to the motor drive circuit.

In the inverter-integrated electric compressor according to the present invention, the seat for affixing the coil component to the motor drive circuit is provided with the protrusion which can be fitted into the seat affixing hole provided in the case member for housing the motor drive circuit, the terminal holes are arranged in the portion where the protrusion is provided, and the conductor wires pulled out from the coil component are inserted in a one-to-one correspondence into the terminal holes in such a manner that the mutual interval between the conductor wires is widened, so that the end of each conductor wire is connected electrically to the motor drive circuit, and therefore an electric connection mechanism consisting of the coil component and the motor drive circuit is simplified. Further, because it becomes unnecessary for the conductor wires pulled out from the coil component in a one-to-one correspondence into the terminal holes provided in the case member to be inserted, the efficiency for attaching the coil component to the motor drive circuit board can be improved. Furthermore, because the protrusion on the seat is formed as fitting into the seat affixing hole of the case member, before the conductor wire and the motor drive circuit are joined the end of the conductor wire can be surely positioned at the joining part, so that the connection reliability of the joining part is sufficiently ensured.

In the present invention, it is possible that the end of the conductor wire is joined with a bus bar provided in the motor drive circuit. Thus the conductor wire and the motor drive circuit are electrically connected to the bus bar, so that the connection reliability at the electrical joint can be sufficiently ensured. In such a case, it is preferable that the terminal hole is perforated as biased to a side of the bus bar in the portion where the protrusion is provided, and that the conductor wire is exposed at the side of the bus bar in the portion where the protrusion is provided. The terminal hole is provided at such a position, so that the bus bar and the conductor wire approach surely and therefore the connection reliability of the electric connection can be further enhanced.

It is possible that a plurality of protrusions for joining are provided at a tip of the bus bar. In such a case, when the bus bar comes to be joined with the conductor wire or another bus bar, the connection reliability of the electric connection can be ensured.

The inverter-integrated electric compressor according to the present invention is suitably applied to a case where the joining is performed by a TIG welding. When the electric connection is achieved by the TIG welding, it is necessary that the interval of the terminals to be welded is widened more than a predetermined interval, so as to prevent are jetted from a welding torch from reaching a site other than any target site for welding. In this regard, because each other's interval of the conductor wires drawn from the coil component is regulated to a predetermined interval by the terminal holes provided as arrayed in the portion where the protrusion is provided in the inverter-integrated electric compressor according to the present invention, the arc for the TIG welding can be accurately jetted toward the target site for welding, so that the connection reliability at a welded site can be ensured.

In the inverter-integrated electric compressor of the present invention, it is preferable that chamfered is a peripheral part of an aperture of the terminal hole at a side of the coil component. For example, the terminal hole can be chamfered into a tapered shape in which an aperture diameter gradually decreases toward a depth direction so that the conductor wire drawn from the coil component is easily and surely inserted into the terminal hole.

In addition, the inverter-integrated electric compressor according to the present invention is applicable to all types of compressors substantially, and specifically, is suitably used as a compressor for automotive air conditioning systems which are installed in a narrow space and are sensitive to noises of other devices.

Effect According to the Invention

In the inverter-integrated electric compressor according to the present invention, the conductor wires pulled out from the coil component are inserted in a one-to-one correspondence into the terminal holes, which are provided in the seat for attaching to the motor drive circuit, in such a manner that the mutual interval between the conductor wires is widened, so that the working efficiency for attaching the coil component to the motor drive circuit can be improved. Particularly, because the protrusion of the seat is fitted into the seat affixing hole provided in the case member, the end of the conductor wire can be accurately positioned at the electrical connection part, so that the connection reliability is improved. In addition, because the conductor wire is inserted in a one-to-one correspondence into each terminal hole, in such a manner that the mutual interval between the conductor wires is widened, superior reliability of the electrical joining by the TIG welding can be ensured.

EMBODIMENTS FOR CARRYING OUT THE INVENTION

Hereinafter, desirable embodiments will be explained as referring to figures.

Figure 1:
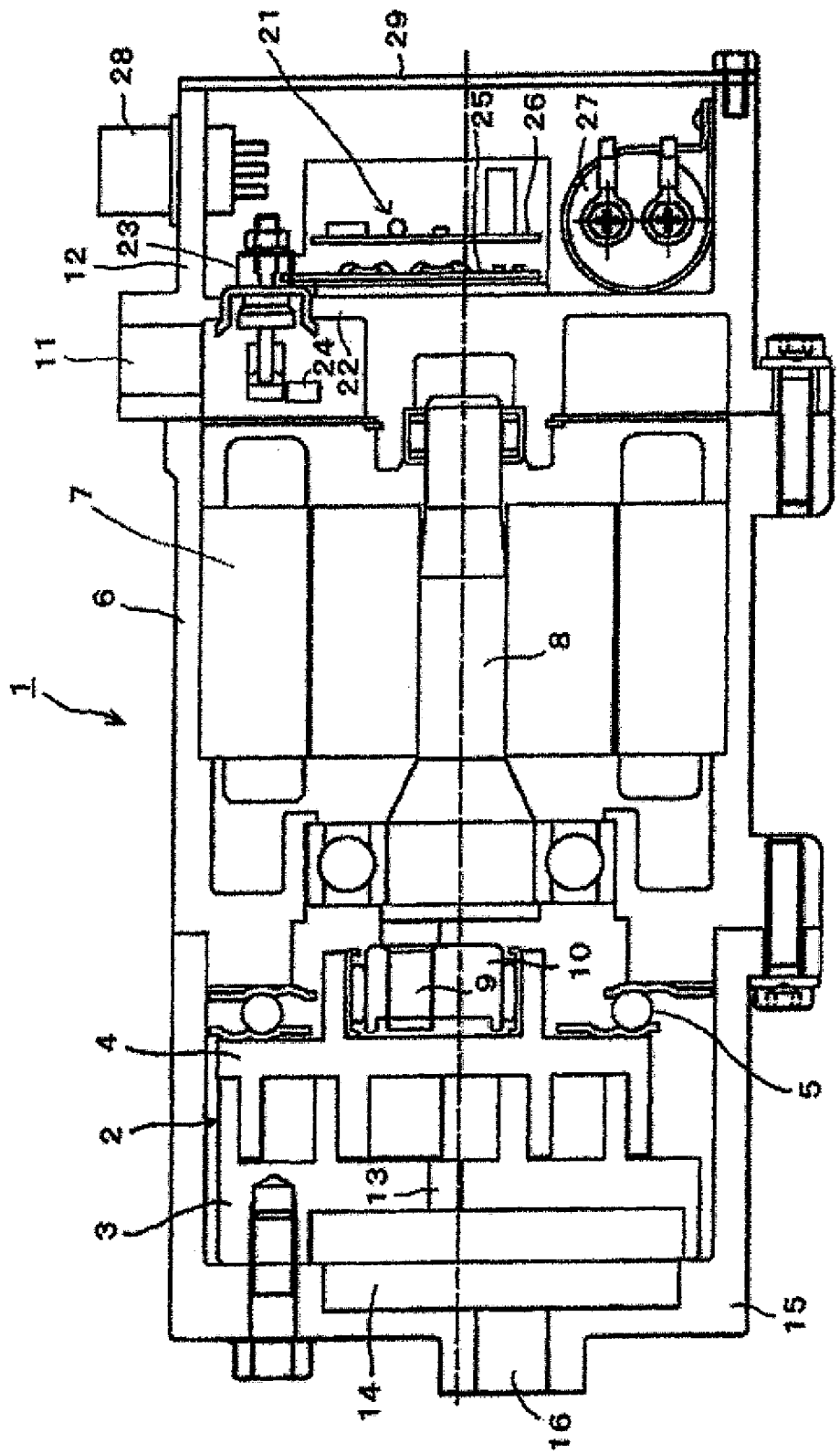
FIG. 1 is a schematic longitudinal sectional view showing a basic configuration of an inverter-integrated electric compressor according to an embodiment of the present invention.

FIG. 1 shows a scroll-type electric compressor used in automotive air conditioning systems as a basic configuration of inverter-integrated electric compressor 1 according to an embodiment of the present invention. In FIG. 1, symbol 2 implies a compression mechanism consisting of fixed scroll 3 and movable scroll 4. Movable scroll 4 is swung relative to fixed scroll 3 while its rotation is prevented with ball coupling 5. Motor 7 is incorporated in compressor housing (center housing) 6, and main shaft 8 (rotation shaft) is driven to rotate by built-in motor 7. The rotational movement of main shaft 8 is converted into the orbital swinging movement of movable scroll 4, through eccentric pin 9 and eccentric bush 10 which is rotatably engaged therewith. In this embodiment, compressor housing (front housing) 12 is provided with suction port 11 for sucking refrigerant as fluid to be compressed. Sucked refrigerant is led to compression mechanism 2 through a placement part of motor 7. The refrigerant which has been compressed with compression mechanism 2 is delivered to an external circuit, through discharge hole 13, discharge chamber 14 and discharge port 16 which is provided in compressor housing (rear housing) 15.

Motor drive circuit 21 for motor 7 is provided in compressor housing 12 (front housing). In more detail, motor drive circuit 21 is provided at the external side of partition wall 22 which is formed in compressor housing 12 against the side of refrigerant suction passageway. Motor drive circuit 21 supplies electricity through seal terminal 23 (an output terminal of motor drive circuit 21), which is attached thereto as penetrating partition wall 22, and lead wire 24 to motor 7, while the refrigerant suction passageway side and the side of motor drive circuit 21 are sealed in the placement part of motor 7. Because motor drive circuit 21 is provided at the external side of partition wall 22, at least one part of electric components including motor drive circuit 21 can be cooled with sucked refrigerant by heat exchange.

Motor drive circuit 21 includes IPM (Intelligent Power Module) 25 having inverter function and control circuit 26, and electric components, such as capacitor 27, are provided either integrally with it or separately from it. Motor drive circuit 21 is connected to an external power supply (not shown) with connector 28 as an input terminal. The aperture side to the outside of compressor housing 12, which mounts these electric components including motor drive circuit 21, is covered as sealed with lid member 29, and these electric components are protected by lid member 29.

Figure 2:
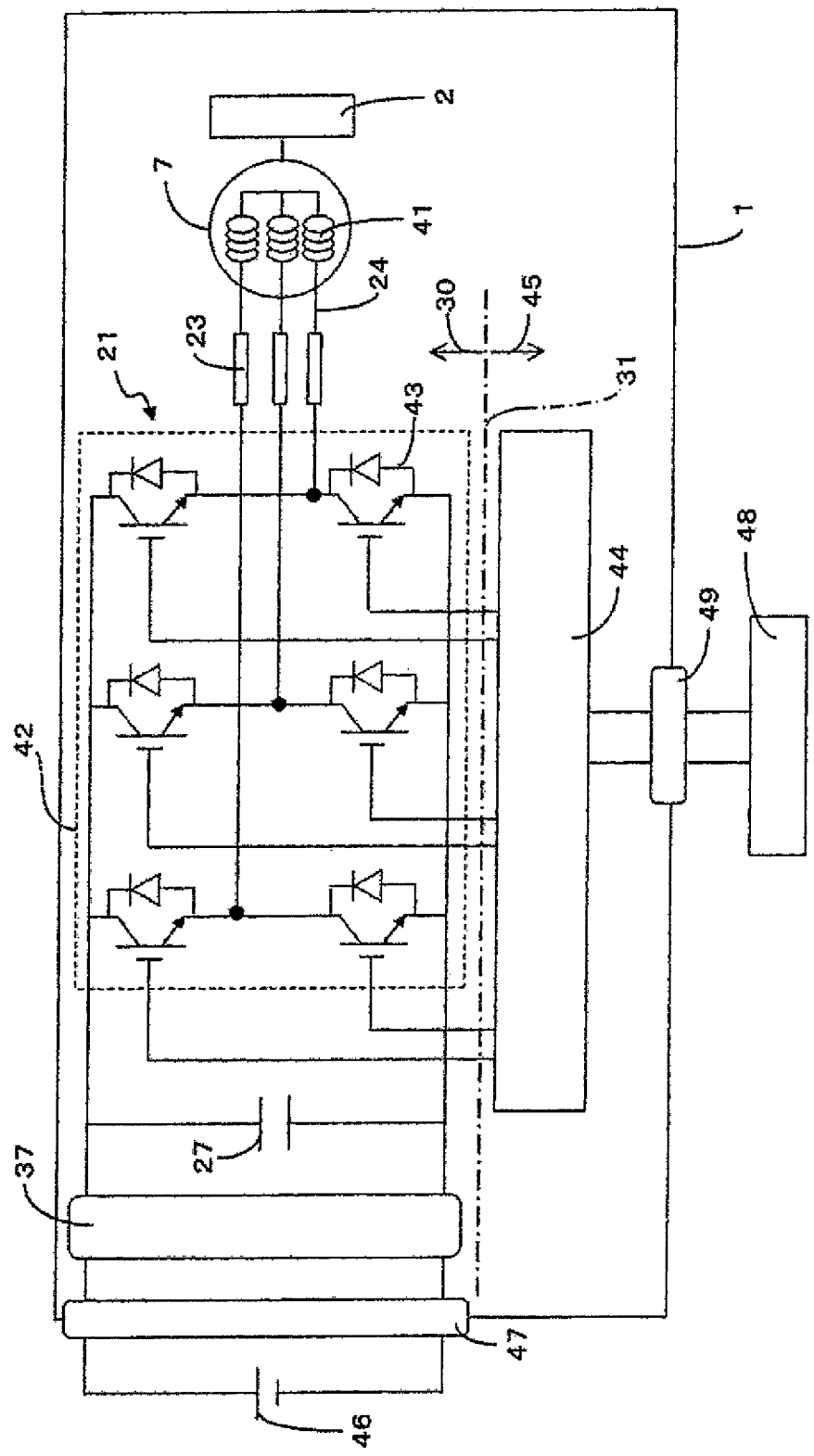
FIG. 2 is a configurational diagram of an air-conditioning control mechanism including the compressor shown in FIG. 1, being depicted like an electric circuit.

The above-described configuration can be shown like an electric circuit, as in FIG. 2. As shown in FIG. 2, electric compressor 1 is provided with motor drive circuit 21. Output electric power is supplied from motor drive circuit 21, through seal terminal 23 and lead wire 24, to each motor wire wrap 41 of built-in motor 7, so that motor 7 is driven to rotate and the compression is performed by compression mechanism 2. Motor drive circuit 21 has high voltage circuit 30 for motor drive and low voltage circuit 45 for control with motor control circuit 44 to control each power element 43 (switching element) of inverter 42 in high voltage circuit 30 for motor drive and low voltage circuit 45 for control is comprised in control circuit 26. The electric power is supplied from external power supply 46 (e.g. battery) through connector 47 for high voltage into high voltage circuit 30 for motor drive, and then supplied through noise filter 37 and capacitor 27 for smoothing to inverter 42. After direct current, which is input from power supply 46, is converted into pseudo-triphase current by inverter 42 and then supplied to motor 7. For example, low voltage electric power is supplied to motor control circuit 44 through connector 49 for control signal from air conditioning control device 48 of a vehicle. In FIG. 2, connector 49 for control signal and connector 47 for high voltage are illustrated at positions apart from each other, but actually, are mounted in the same connector 28 shown in FIG. 1. Shield plate 31, which is fixed to control circuit 26, is interposed between high voltage circuit 30 for motor drive and control circuit 26 with low voltage circuit 45 for control, and it covers over high voltage circuit 30 for motor drive as much as possible so as to block the effect of noise on the side of low voltage circuit 45 for control from high voltage circuit 30 for motor drive.

Figure 3:
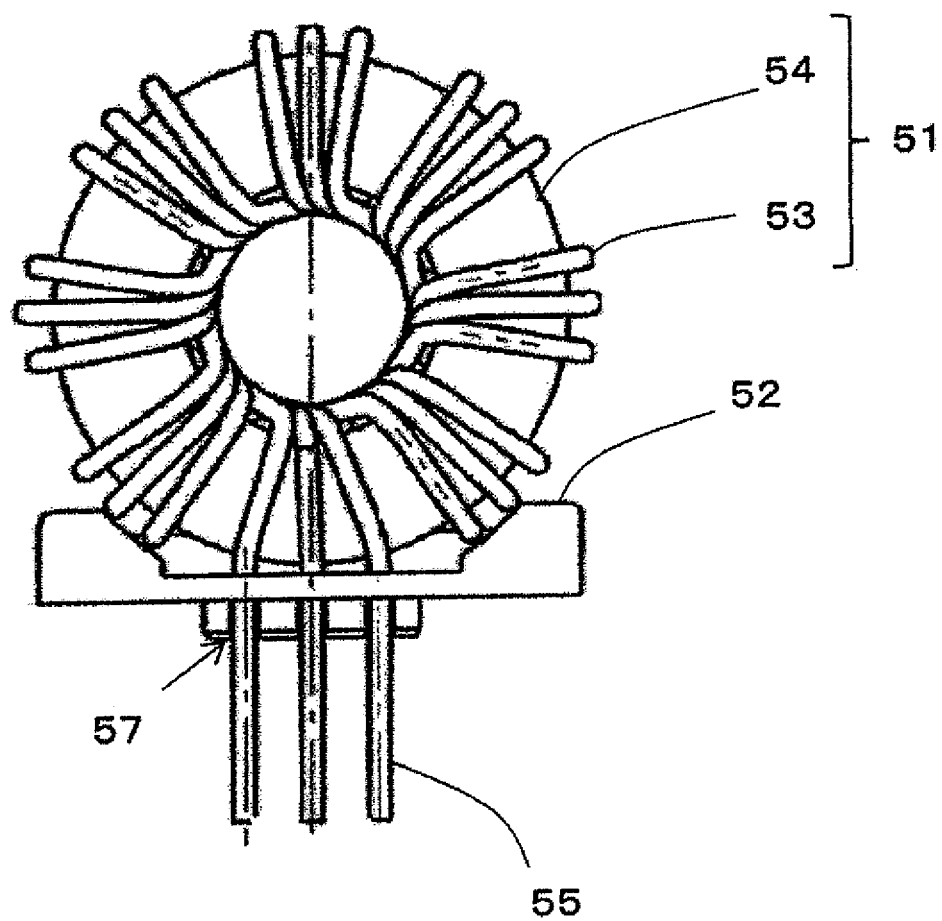
FIG. 3 is an elevational view showing a coil component and a seat, which are mounted in the motor drive circuit of the compressor in FIG. 1.

FIG. 3 is a figure showing coil component 51 which is attached to motor drive circuit 21 in FIG. 1 and seat 52 which supports and attaches coil component 51 to motor drive circuit 21. Coil component 51 consists of coil 53 and core 54 (or a core case which houses the core). Three sets of coil wires 55 are wound in parallel around core 54 of a doughnut shape so as to form coil 53. Seat 52 is provided with six terminal holes 57, in which each end of total six coil wires 55 is inserted one by one with each interval widened.

Figure 4:
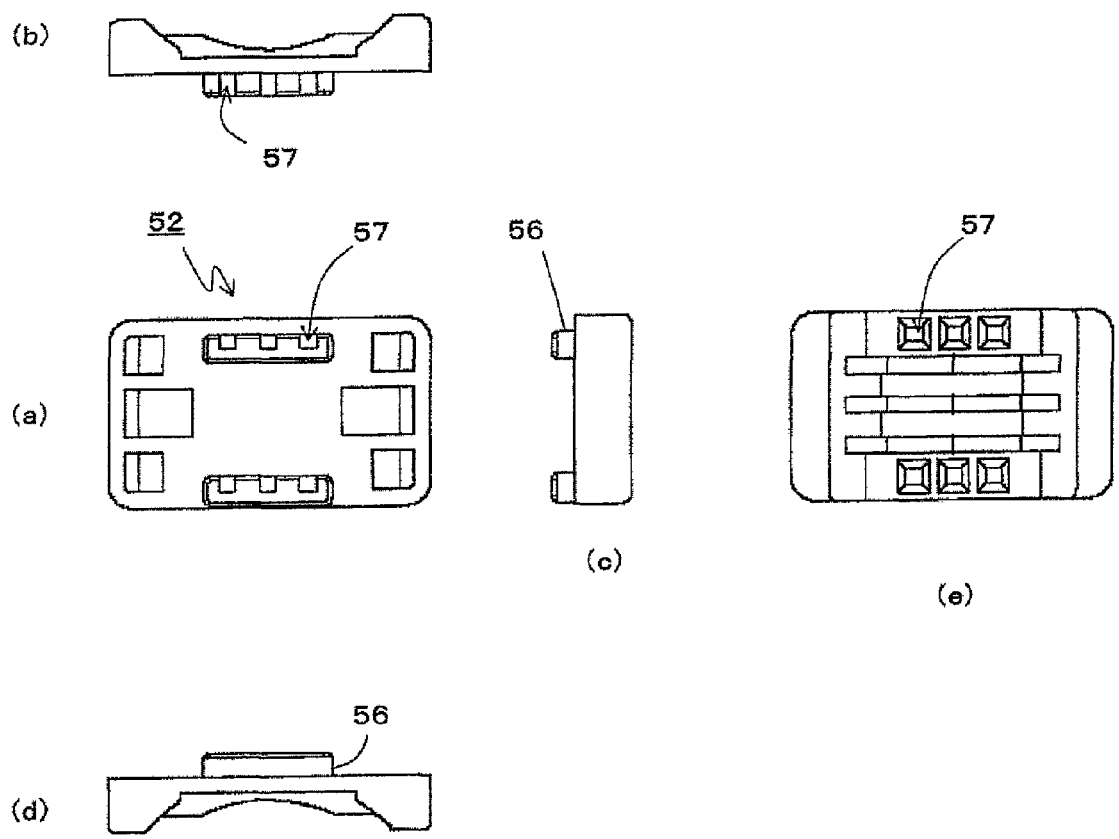
FIG. 4 shows the seat in FIG. 3, where (*a*) is a plan view, (*b*) is a back elevational view, (*c*) is a right side view, (*d*) is a front elevational view and (*e*) is a bottom plan view.

FIG. 4 shows seat 52 in FIG. 3, where (*a*) is a plan view, (*b*) is a back elevational view, (*c*) is a right side view, (*d*) is a front elevational view and (*e*) is a bottom plan view. Seat 52 is provided with protrusion 56 shaped into a long piece, and terminal holes 57 into which coil wires 55 are inserted are perforated into protrusion 56. In FIG. 4 (*a*), terminal holes 57 are perforated as biased to upper side of FIG. 4 (*a*) into a portion where protrusion 56 is provided. Thus positions of terminal holes 57 are biased to one direction, and therefore coil wire 55 which has been inserted into terminal hole 57 becomes surely close to bus bar 60 to be described below when coil wire 55 is electrically connected to motor drive circuit 21, so that reliability of connection between coil component 51 and motor drive circuit 21 can be sufficiently ensured. Further, in FIG. 4 (*b*), because coil conductor wire 55 of coil component 51 is inserted from upper side of the figure, when a peripheral part of the aperture of terminal hole 57 at the side of coil component 51 is chamfered, coil wire 55 can be easily and surely inserted into terminal hole 57. In FIG. 4 (*e*), such a chamfering is performed toward a top and bottom right and left direction from terminal hole 57.

Figure 5:
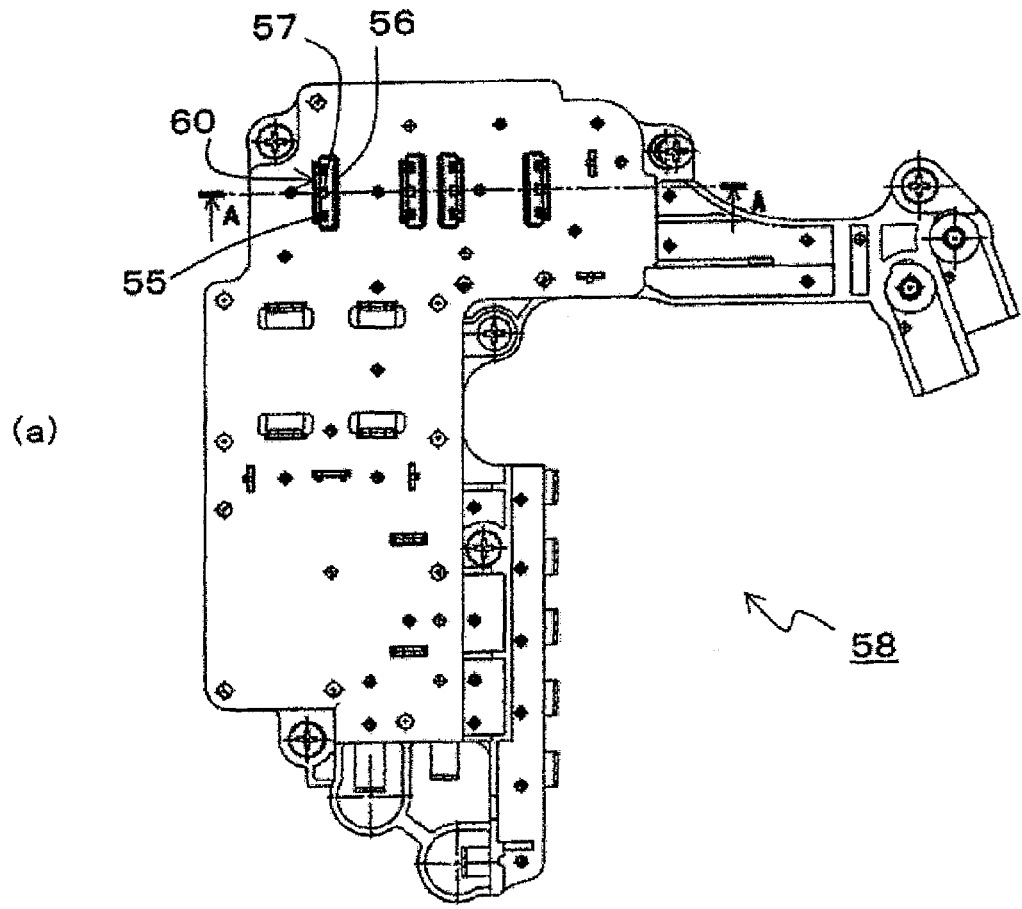
FIG. 5 shows a state where the coil component and the seat are attached to the motor drive circuit of the compressor in FIG. 1, where (*a*) is a top plan view and (*b*) is an A-A cross-sectional view of (*a*).
Figure 5:
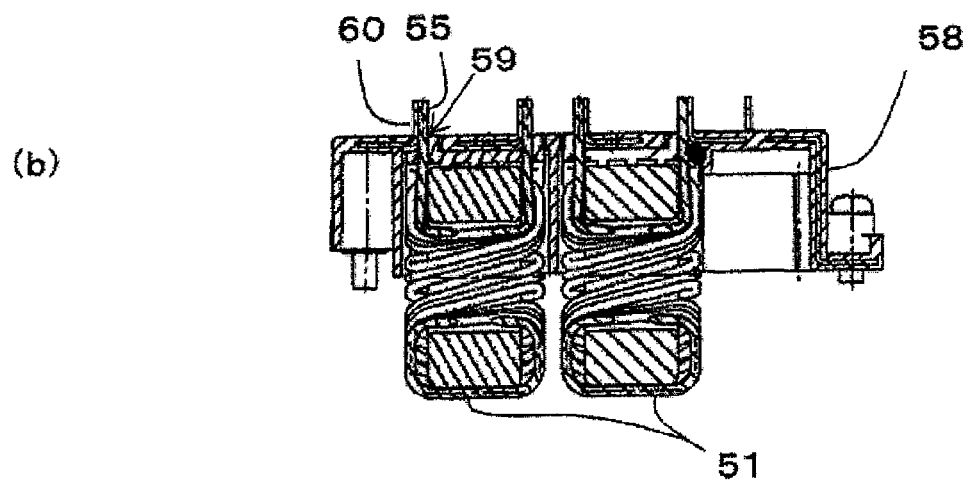

FIG. 5 shows a state where coil component 51 is attached through seat 52 to case member 58 housing motor drive circuit 21, and (*a*) is a top plan view and (*b*) is an A-A cross-sectional view of (*a*). Protrusion 56, which is provided in seat 52, is fitted into seat affixing hole 59 provided in case member 58. Conductor wire 55 inserted into terminal hole 57 is electrically connected to bus bar 60, which is provided in case member 58, by TIG welding. Because terminal holes 57 are perforated as biased toward bus bar 60 in a portion where protrusion 56 is provided, coil wire 55 and bus bar 60 are sufficiently close to each other and therefore the connection reliability of the electrical joint is sufficiently ensured.

Figure 6:
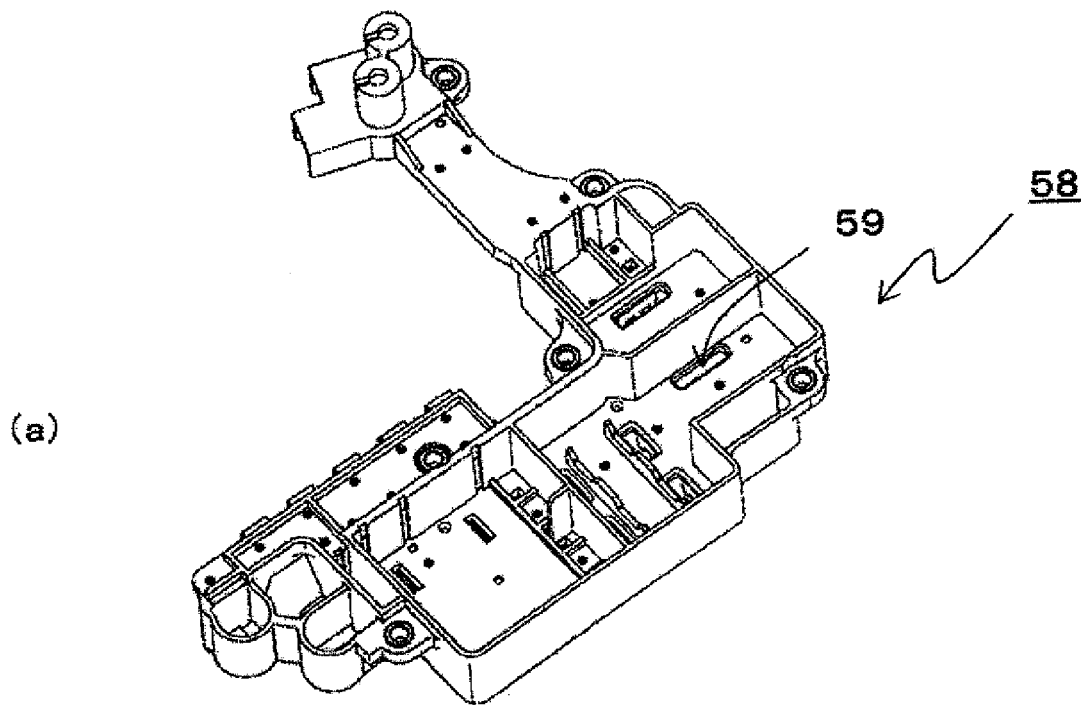
FIG. 6 shows a case member shown in FIG. 5, where (*a*) is a perspective view from the back side of the surface shown in FIGS. 5 (*a*), and (*b*) is a perspective view from the side of the surface shown in FIG. 5 (*a*).
Figure 6:
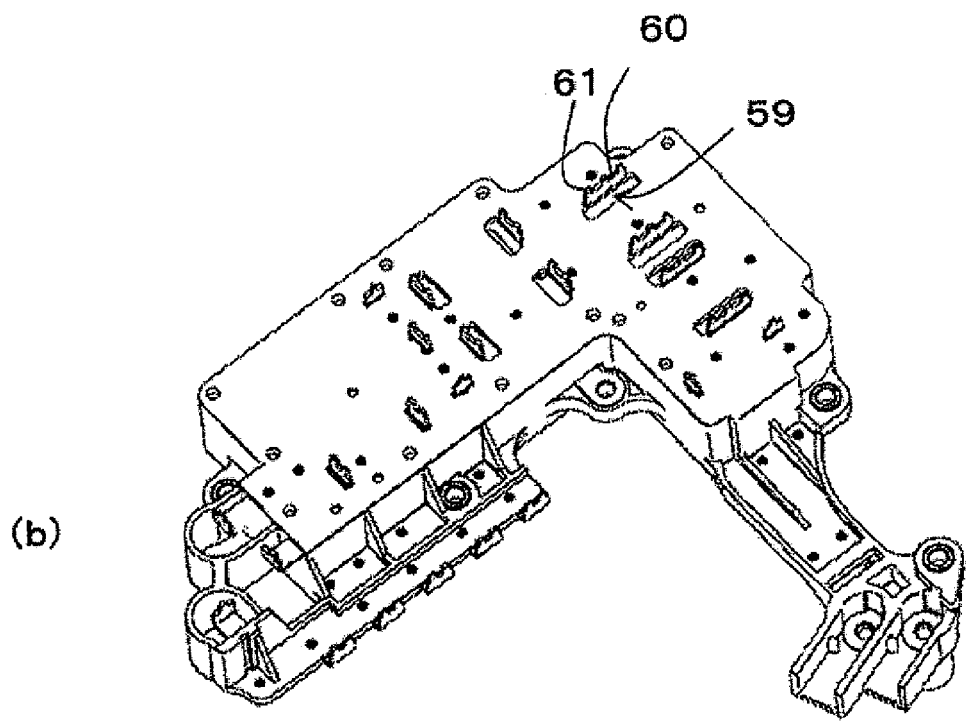

FIG. 6 shows case member 58 in FIG. 5, where (*a*) is a perspective view from the back side of the surface shown in FIGS. 5 (*a*), and (*b*) is a perspective view from the side of the surface shown in FIG. 5 (*a*). In FIG. 6 (*b*), bus bar 60, which is provided along one end of seat affixing hole 59, is provided with three protrusions 61 for joining. Thus a plural of protrusions 61 for joining are provided, so that when bus bar 60 and coil wire 55, or another bus bar, are joined, the connection reliability of the electrical joint can be enhanced.

INDUSTRIAL APPLICATIONS OF THE INVENTION

The inverter-integrated electric compressor according to the present invention is applicable to all types of compressors substantially, and specifically suitably used as a compressor for an automotive air conditioning system which is mounted in a narrow space and is sensitive to noise received from other devices.

EXPLANATION OF SYMBOLS

1: inverter-integrated electric compressor
2: compression mechanism
3: fixed scroll
4: movable scroll
5: ball coupling
6: compressor housing (center housing)
7: motor
8: main shaft
9: eccentric pin
10: eccentric bush
11: suction port
12: compressor housing (front housing)
13: discharge hole
14: discharge chamber
15: compressor housing (rear housing)
16: discharge port
21: motor drive circuit
22: partition wall
23: seal terminal
24: lead wire
25: IPM
26: control circuit
27: capacitor
28: connector
29: lid member
30: high voltage circuit for motor drive
31: shield plate
37: noise filter
41: motor wire wrap
42: inverter
43: power element
44: motor control circuit
45: low voltage circuit for control
46: external power supply
47: connector for high voltage
48: air conditioning control device
49: connector for control signal
51: coil component
52: seat
53: coil 54: core
55: wire
56: protrusion
57: terminal hole
58: case member
59: seat affixing hole
60: bus bar
61: protrusion for joining

The invention claimed is:

1. An inverter-integrated electric compressor, comprising:
   a compressor housing;
   a motor incorporated in the housing;
   a motor drive circuit including an inverter;
   a case member in the housing and configured to accommodate said motor drive circuit, the case member having a seat-affixing hole and a seat provided with a a protrusion fitted into the seat-affixing hole; and
   a coil component comprising a plurality of conductor wires attached to said motor drive circuit through a plurality of terminal holes in the seat,
   wherein the plurality of terminal holes are arranged in a portion of the seat at which said protrusion is provided, said conductor wires from said coil component being inserted, in a one-to-one correspondence, into said plurality of terminal holes in such a manner that a mutual interval between said conductor wires is widened by the insertion, the protrusion protruding from the seat in a direction of insertion of said conductor wires, and an end of each conductor wire being connected electrically to said motor drive circuit.

2. The inverter-integrated electric compressor according to claim 1, wherein said end of each said conductor wire is joined with a bus bar provided in said motor drive circuit.

3. The inverter-integrated electric compressor according to claim 2, wherein each said terminal hole is perforated as biased to a side of said bus bar in said portion of the seat at which said protrusion is provided, and said conductor wire is exposed at said side of said bus bar in said portion at which said protrusion is provided.

4. The inverter-integrated electric compressor according to claim 2, wherein a plurality of protrusions for joining are provided at a tip of said bus bar.

5. The inverter-integrated electric compressor according to claim 2, wherein said joining is performed by a TIG welding.

6. The inverter-integrated electric compressor according to claim 1, wherein a peripheral part of an aperture of each said terminal hole at a side of said coil component is chamfered.

7. The inverter-integrated electric compressor according to claim 1, wherein the compressor is a compressor adapted for automotive air conditioning systems.

* * * * *